United States Patent [19]

Mizukawa et al.

[11] Patent Number: 5,530,496
[45] Date of Patent: Jun. 25, 1996

[54] OVERHEAD PROJECTOR

[75] Inventors: Shigeo Mizukawa; Masaaki Morizumi; Katsuo Katagiri, all of Omiya, Japan

[73] Assignee: Fuji Photo Optical Co., Ltd., Saitama-ken, Japan

[21] Appl. No.: 206,180

[22] Filed: Mar. 7, 1994

[30] Foreign Application Priority Data

Mar. 5, 1993 [JP] Japan ..................... 5-071187
Apr. 27, 1993 [JP] Japan ..................... 5-123497

[51] Int. Cl.⁶ ............................................. G03B 21/00
[52] U.S. Cl. .................... 353/63; 353/69; 353/DIG. 3; 353/DIG. 4
[58] Field of Search .................... 353/63, 64, 65, 353/66, 69, 70, 98, 99, DIG. 3, DIG. 4, DIG. 6

[56] References Cited

U.S. PATENT DOCUMENTS

| | | | |
|---|---|---|---|
| 3,547,530 | 12/1970 | Poole | 353/70 |
| 4,002,408 | 1/1977 | Amma | 353/70 |
| 4,406,530 | 9/1983 | Hasegawa et al. | 353/66 |
| 4,846,570 | 7/1989 | Kanai | 353/DIG. 3 |
| 4,974,958 | 12/1990 | Yoshida | 353/69 |

FOREIGN PATENT DOCUMENTS

| | | | |
|---|---|---|---|
| 3915174 | 11/1990 | Germany | 353/63 |
| 0053425 | 4/1977 | Japan | 353/70 |

Primary Examiner—William C. Dowling
Attorney, Agent, or Firm—Keck, Mahin & Cate

[57] ABSTRACT

An overhead projector for projecting an image of a sheet material placed on a flat stage onto a remote screen standing almost vertically has a projection optical system with its optical axis aligned with a normal line of the stage. The projection optical system is shifted keeping the optical axis in parallel with the normal line so as to project an image at an angle of elevation onto the screen.

8 Claims, 8 Drawing Sheets

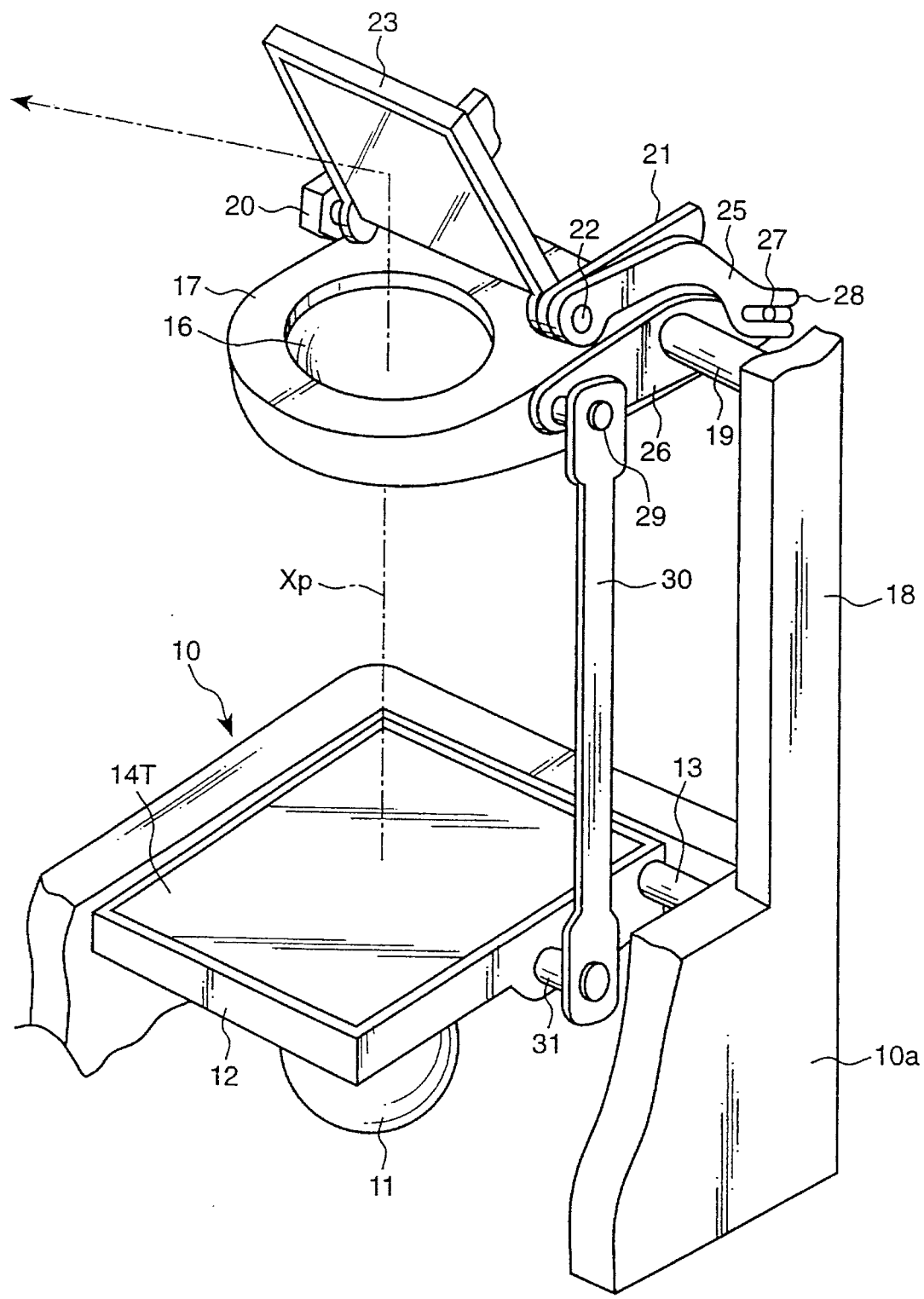

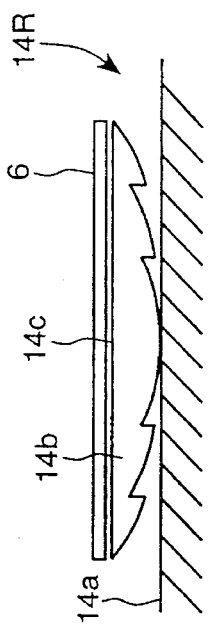
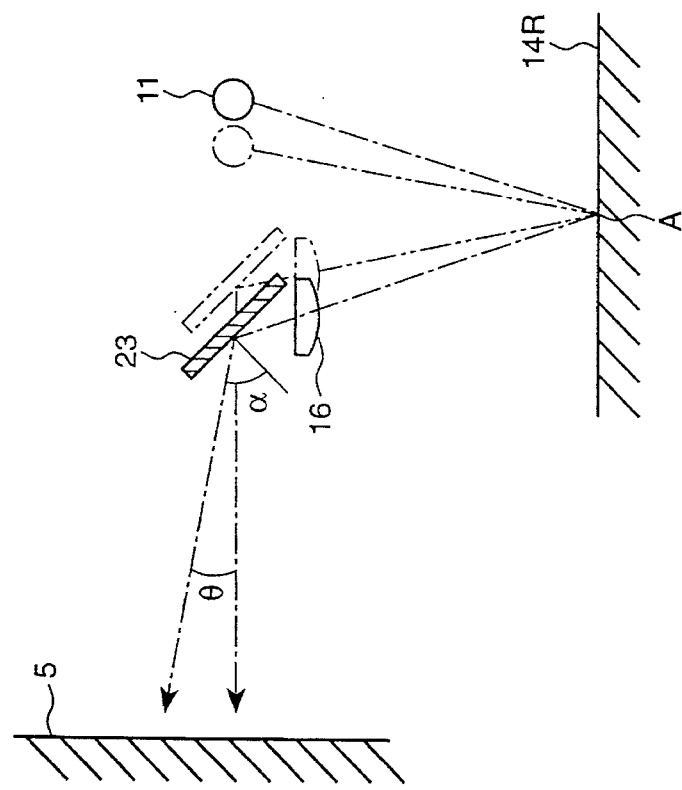

OVERHEAD PROJECTOR

BACKGROUND OF THE INVENTION

1. Field of the Invention

This invention relates to the structure of an overhead projector for projecting an image of a sheet material on a screen remote from the overhead projector.

2. Description of Related Art

Conventionally, overhead projectors are often used on conferences, lectures and educational or presentation meetings to project images of, for instance, documentary information and/or drawings recorded on transparent sheet materials, such as chart films, on a remote screen standing vertically and located remote from the overhead projector. Such an overhead projector is configured by various elements, such as a light source, a stage on which a sheet material is placed, a projection lens system, a reflective projection mirror, etc.

In order to provide an easy understanding of the configuration of the transmission type of conventional overhead projector, reference is made to FIG. 1. The transmission type of overhead projector includes its essential optical elements such as a light source 2, a projection lens system 3 and a reflective projection mirror 4. The light source 2 is fixedly installed beneath a flat transparent stage 1, on which a transparent sheet, such as a film sheet, is placed, so as to illuminate the transparent sheet. The projection lens system 3, which is installed above the stage 1 so as to have its optical axis X in alignment with a normal line of the transparent stage 1, forms and directs an optical image of documents and/or drawings recorded on the transparent sheet to a reflective projection mirror 4, placed above the projection lens system 3 at an angle of 45 degrees relative to the optical axis X of the projection lens system 3, so as to project an enlarged image of the documents and/or drawings of the transparent sheet onto a remote screen 5 placed approximately vertically.

With such a conventional overhead projector, the reflective projection mirror 4 is absolutely indispensable in order to reflect and direct the optical axis X of the projection lens system 3 upward and toward the remote screen 5. Specifically, when the optical axis of X of the projection lens system 3 must be directed toward the remote screen 5 at an angle of elevation θ relative to a horizontal line, the reflective projection mirror 4 is further tilted or inclined half the angle of elevation θ from its original position wherein it is at an angle of 45 degrees relative to the horizontal line as indicated in FIG. 5. In such a manner, the enlarged image of the documents and/or drawings is projected overhead on the remote screen 5 so as to be observed or watched by viewers without any obstruction.

Reference is made to FIG. 3 schematically showing a reflex type of conventional overhead projector, a light source 2 is disposed above a stage 1, having a reflective surface on which a transparent sheet is placed, and off the upper right of the center A of the stage 1. With this reflex type of overhead projector, light emanating from the light source 2 is reflected by the reflective stage 1 and then illuminates a transparent sheet placed on the reflective stage 1 from the under side. An image of the transparent sheet, formed by a projection lens system 3, is directed toward a remote screen 5 by a reflective projection mirror 4 and projected on the remote screen 5 as an enlarged image.

However, as shown in FIG. 3, with the conventional overhead projector, tilting or inclining of the reflective projection mirror 4 upward from its original position, in which the reflective projection mirror 4 is at an angle of 45 degrees, due to a demand of projecting of an image at an angle of elevation so as to form it on the remote screen 5 at the best height for viewers, subjects unavoidably the image to unacceptable distortion. Specifically, as shown in FIG. 2 by example in which the optical axis X of the projection lens system 3 is unfolded straight for an easy understanding, when there is a relative inclination of an angle 8 between the optical axis X of the projection lens system and the normal line Y of the screen 5, which is produced as an angle of elevation by the reflective projection mirror 4, a rectangular transparent sheet 6 is projected on the screen 5 as an enlarged distorted image 6M having an expanded upper side and a reduced lower side or a reversed trapezoidal configuration. In this instance, the enlarged image 6M is out of focus or indistinctly clear, in particular, at the upper and lower side margins on the screen 5 and consequently, gives viewers even an unpleasant feeling.

SUMMARY OF THE INVENTION

It is, therefore, an object of the present invention to provide an overhead projector which can minimize distortion of an image caused by tilting or inclining a reflective projection mirror.

It is another object of the present invention to provide an overhead projector which can project a sharp image overhead on a remote screen or in a position desirable for viewers.

The foregoing objects of the present invention are achieved by providing an overhead projector, which may be of a transmission type or a reflex type, for projecting an image of a sheet material placed on a flat stage onto a remote screen standing almost vertically with the use of a reflective projection mirror, disposed above a projection lens system and inclined an angle of 45 degrees, which directs the image formed by the projection lens system horizontally toward the remote screen. The overhead projector includes a linkage means, operationally coupling the stage, the projection optical means, including the projection lens system and the reflective projection mirror, and the light source means so as to cause positional shifts of the projection lens system and the light source means relative to the stage keeping a parallelism between the stage and the projection lens system.

Because this linkage means always keeps an optical parallelism among the stage, the projection optical means and the remote screen, even when the overhead projector projects an image at an angle of elevation, the enlarged image is well focused and has no distortion on the remote screen.

BRIEF DESCRIPTION OF THE DRAWINGS

The above and other object of the present invention will be clearly understood from the following detailed description directed to preferred embodiments thereof when considered in conjunction with the accompanying drawings, wherein the same reference numbers have been used to denote the same or similar elements or parts throughout the drawings, and in which:

FIG. 4 is a perspective view of a transmission type of an overhead projector in accordance with a preferred embodiment of the present invention;

FIG. 14 is an schematic illustration of the overhead projector shown in FIG. 13 which projects an image at an angle of elevation; and FIG. 15 is a cross-sectional view of a reflective stage of the overhead projector of FIG. 13.

DETAILED DESCRIPTION OF THE PREFERRED EMBODIMENT

Figure 3:
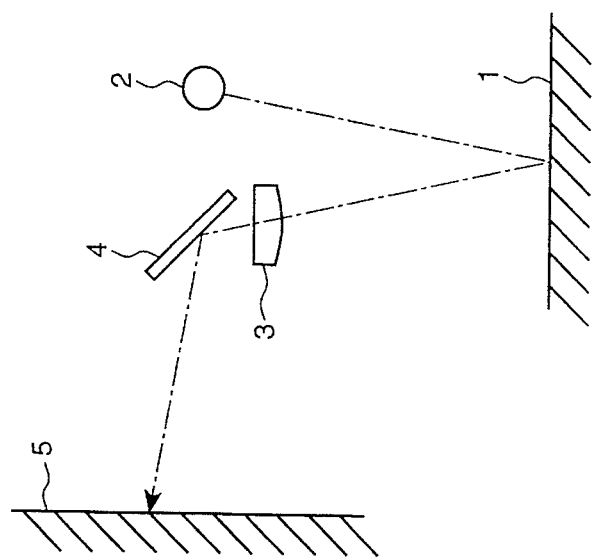
FIG. 3 is a schematic illustration of a reflex type of conventional overhead projector.
Figure 2:
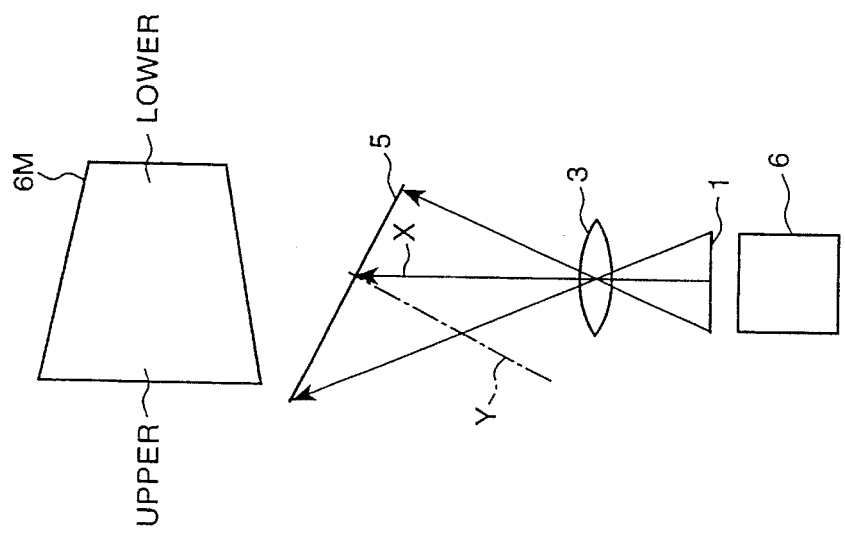
FIG. 2 is a diagram showing an optical path between a stage surface and a screen of the conventional overhead projector shown in FIG. 1.
Figure 1:
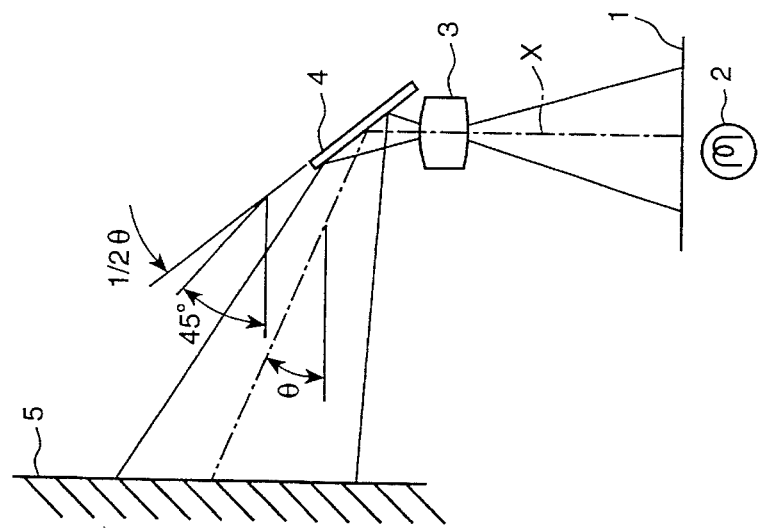
FIG. 1 is a schematic illustration of a transmission type of conventional overhead projector.

Referring to the drawings in detail, and, in particular, to FIG. 4, a transmission type of overhead projector in accordance with a preferred embodiment of the present invention is shown. This overhead projector includes a generally box-shaped light source housing 10 having a flat bottom wall (not shown), within which a light source 11 is fixedly installed. A flat transparent stage 14T, for placing a transparent sheet with documentary information and/or drawings thereon, which is hereafter referred occasionally to as a stage surface, is held by a stage holder frame 12 and forms a top wall of the box-shaped light source housing 10. This stage holder frame 12 is pivoted for rotative movement by a pivot rods 13 fixed to and extending in parallel with the flat bottom wall from the side walls 10a of the box-shaped light source housing 10. The stage holder frame 12 is further provided with a link rod 31 on its one side. The box-shaped light source housing 10 is integrally formed, or otherwise fixedly provided, at its rear ends with vertically extending side stays 18 (only one of which is shown). A lens holder frame 17, holding a projection lens system 16 which is adjustable in focus, is fixedly mounted on a horizontally extending shaft 19, which is in parallel with the pivot rods 13 and is supported for rotative movement by and between these side stays 18, so as to locate the projection lens system 16 above the center of the transparent stage 14T. Bracket arms 20 and 21 extending, respectively, from the side stays 18, support a reflective projection mirror 23 for rotative movement by means of pivot rods 22 secured to the reflective projection mirror 23 and locate it above the lens holder frame 17. Each of the pivot rods 22 is fixedly attached with one end of a first link lever 25 with an open ended slot 28 at its opposite end. In other words, this first link lever 25 is structurally integral with the reflective projection mirror 23.

A second link lever 26, which is cemented, or otherwise secured, to each lateral side of the lens holder frame 17 and has the approximately same length as the first link lever 25, is penetrated at its lengthwise mid center by the horizontally extending shaft 19. The second link lever 26 is fixedly provided at its rear end with a link pin 27 and at its forward end with a link rod 29. The link pin 27 is received for sliding movement in the open ended slot 28 of the first link lever 25. A third link lever 30 operationally links the stage holder frame 12 and the second link lever 26, and hence the lens holder frame 17, in parallel with each other by means of the link rods 31 and 29, respectively. This link mechanism, including the first, second and third link levers 21, 26 and 30, is adapted to hold the reflective projection mirror 23 at an angle of 45 degrees relative to the optical axis $X_p$ of the projection lens system 16 when the stage holder frame 12 and the lens holder frame 17 are held horizontally and enables all of the optical elements, i.e. the transparent stage 14T, the projection lens system 16 and the reflective projection mirror 23 to turn as one whole in the same directions.

In this instance, as was previously described, since the first link lever 25 has the same length between the linked points at 22 and 28 as the second link lever 26 between the linked points at 28 and 29, and the second link lever 26 has the link pin 28 and the link rod 29 at the same distance from the horizontally extending shaft 19, inclining of the first link lever 25 through an angle of θ causes the second link lever 26 to incline through an angle of θ/2. That is, inclining of the reflective projection mirror 23 through an angle of θ causes both projection lens system 16 and transparent stage 14T to incline through an angle of 2θ. Otherwise, inclining of either one of the projection lens system 16 and the transparent stage 14T to incline through an angle of 2θ causes the reflective projection mirror 23 to incline through an angle of θ. Accordingly, the parallel arrangement between the transparent stage 14T and the projection lens system 16 always holds them in parallel with the remote screen 5.

Figure 6:
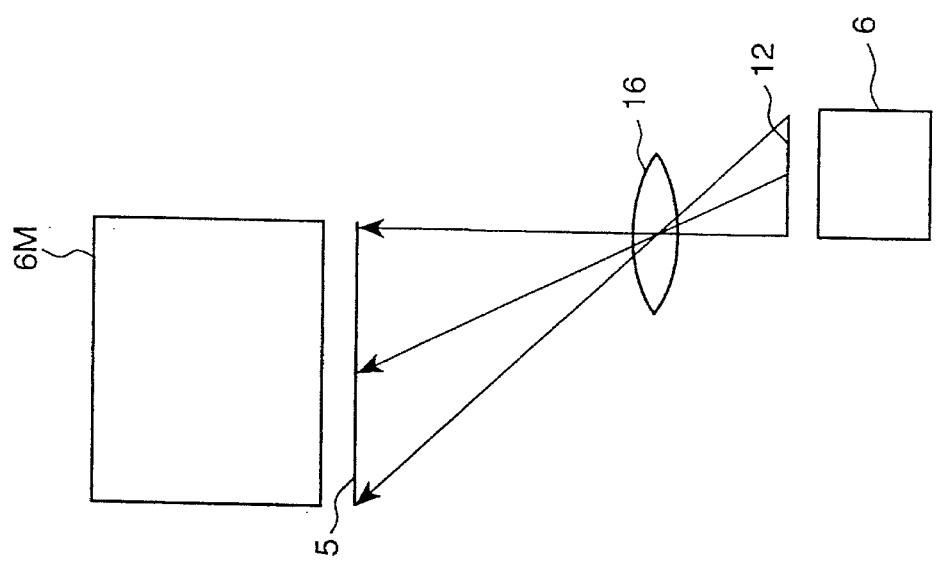
FIG. 6 is an illustration showing distortion of an optical path between a stage and a screen.
Figure 5:
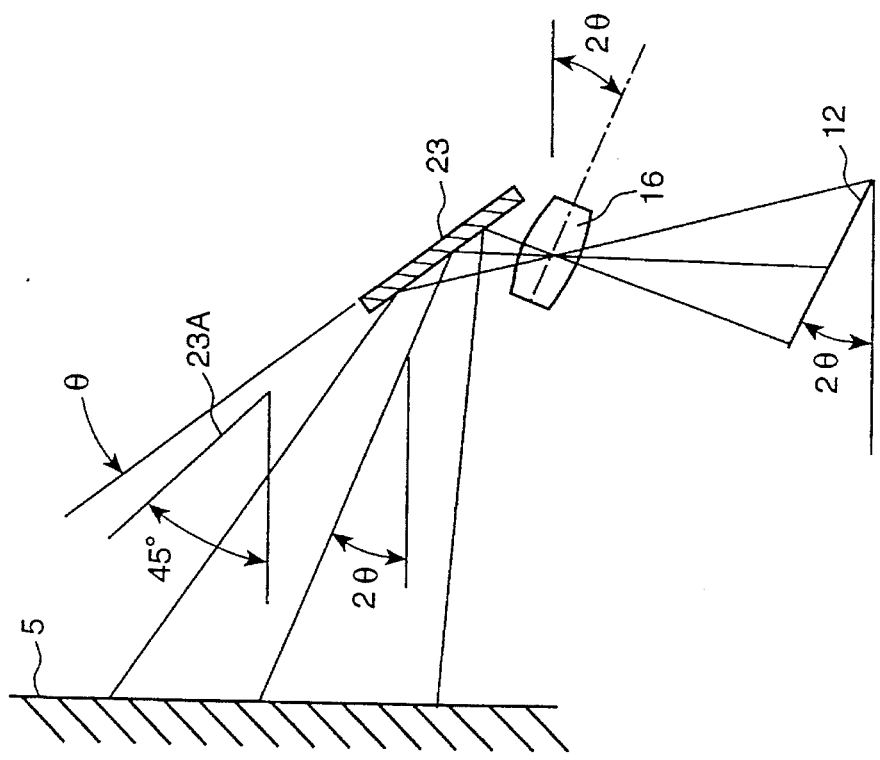
FIG. 5 is an schematic illustration of the overhead projector shown in FIG. 1 which is in its standard position.

Referring to FIGS. 5 and 6 schematically illustrating an optical aspect or geometry of the overhead projector shown in FIG. 4, when there is a demand of projecting of an image at an angle of elevation 2θ on the remote screen 5 so as to provide the best view at the best height for viewers, either one of the projection lens system 16 and the transparent stage 14T is inclined through an angle equal to the angle of elevation 2θ, or otherwise the reflective projection mirror 23 is inclined through an angle equal to half the angle of elevation 2θ. As shown in FIG. 6, since the parallelism is always held among the transparent stage 14T, the projection lens system 16 and the remote screen 5 even when the overhead projector is adjusted so as to projects an enlarged image on the screen 5 at an angle of elevation, the enlarged image 6M has no distortion. In a more practical application, the overhead projector may be equipped with a motor drive feature.

Figure 7:
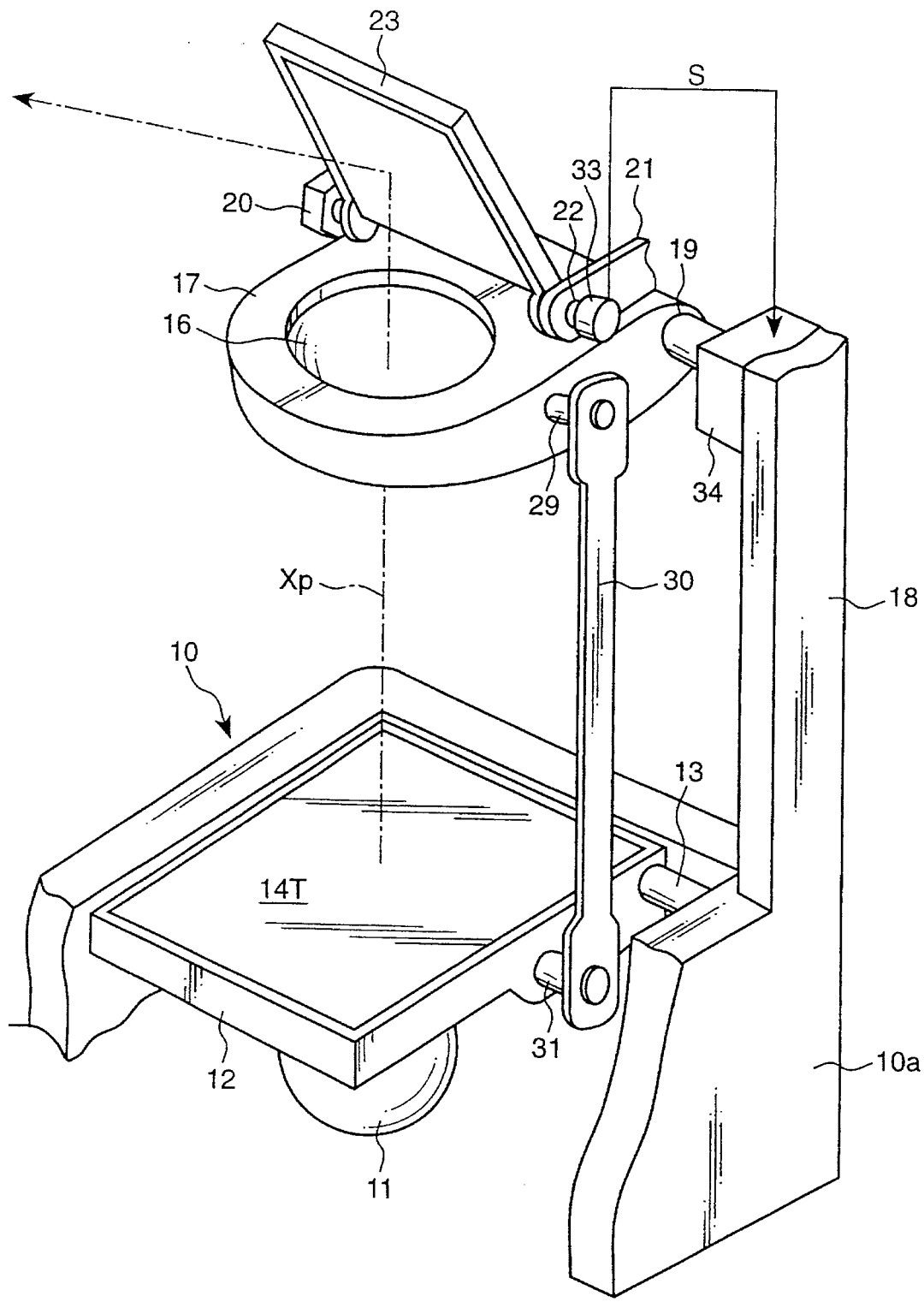
FIG. 7 is a perspective view of an overhead projector, similar to that of FIG. 4, equipped with a motor drive feature.

Referring to FIG. 7 showing a transmission type of motor drive overhead projector, the motor drive overhead projector has the same structure as the overhead projector shown in FIG. 4, excepting that it is equipped with an angular sensor 33 and a motor 34, such as a stepping motor, in place of the first and second link levers 25 and 26 of the link mechanism of the overhead projector shown in FIG. 4, respectively. The angular sensor 33 is attached to one of pivot rods 22 secured to the reflective projection mirror 23 and detects a rotated angle of the pivot rod 22, and hence the reflective projection mirror 23, and the motor 34 is disposed between a horizontally extending shaft 19, on which a lens holder frame 17 is fixedly mounted, and one of side stays 18 (only one of which is shown). The motor 34 has its output shaft (not shown) directly connected to the horizontally extending shaft 19. When the angular sensor 33 detects a rotated angle θ of the pivot rod 22, it provides a signal S representative of an angle of 2θ. With this signal S, the motor 34 is turned through an angle of 2θ. As a result, the horizontally extending shaft 19 turns through the angle of 2θ, turning the lens holder frame 17 and the stage holder frame 12, linked by means of a link lever 30 to each other, through the angle of 2θ all at once.

It is to be understood that the motor 34 may be equipped so as to cooperate with one of pivot rods 13 fixed to side walls 10a of a box-shaped light source housing 10. Otherwise, the motor 34 may be equipped so as to cooperate with one of pivot rods 22 secured to the reflective projection mirror 23. In this modification, the angular sensor 33 is attached either one of the horizontally extending shaft 19 and one of the pivot rods 13, and is adapted to provide a signal S' representative of an angle of θ when it detects an rotated angle of 2θ of the horizontally extending shaft 19 or the pivot rod 13. With this signal S', the motor 34 is turned through an angle of θ. Furthermore, a gear train may be incorporated among the stage holder frame 12, the lens holder frame 17 and the reflective projection mirror 23 so as to cause a turn of the stage holder frame 12 and the lens holder frame 17 through an angle of 2θ accompanied by a turn of the reflective projection mirror 23 through an angle of θ or to cause a turn of the reflective projection mirror 23 through an angle of θ accompanied by a turn of the stage holder frame 12 and the lens holder frame 17 through an angle of 2θ. It is of course that a motor, a gear train and levers may be incorporated in combination.

Figure 9:
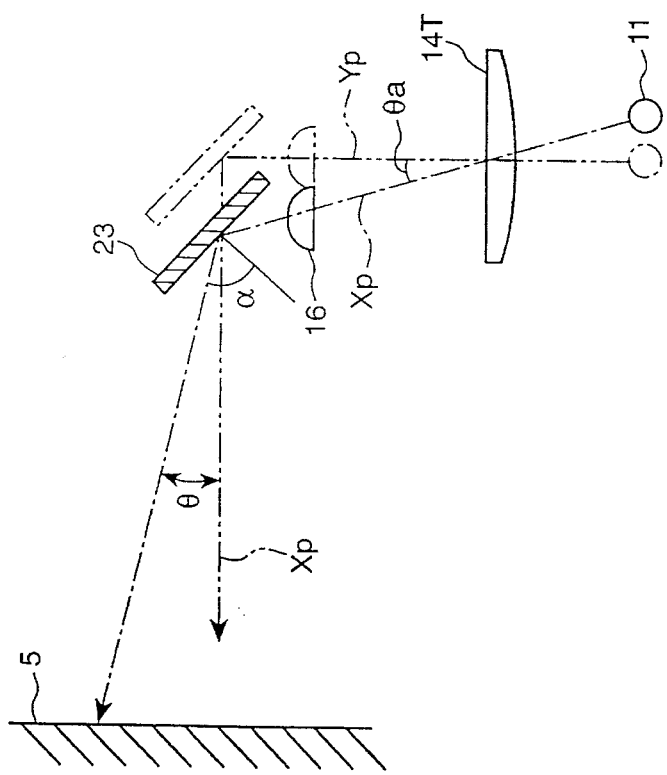
FIG. 9 is a diagram showing an optical path between a stage surface and a screen of the overhead projector of FIG. 8.
Figure 8:
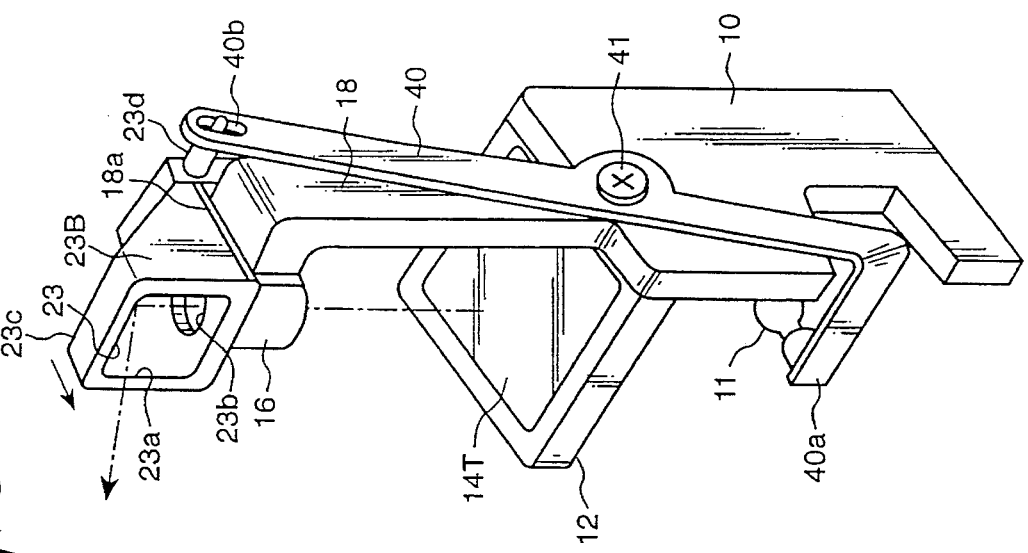
FIG. 8 is a perspective view of a transmission type of an overhead projector in accordance with another preferred embodiment of the present invention.

Referring to FIGS. 8 and 9, a transmission type of overhead projector in accordance with another preferred embodiment of the present invention is shown as a transparent type by example. This overhead projector includes a light source housing 10 (only one side wall is shown). A flat transparent stage 14T made of, for instance, a Fresnel lens, for placing a transparent sheet with documentary information and/or drawings thereon, which is hereafter referred occasionally to as a transparent stage surface, is held by a stage holder frame 12 secured to the light source housing 10 so as to form a top wall of the light source housing 10. The light source housing 10 is integrally formed, or otherwise fixedly provided, at its rear ends with a vertically extending side stay 18. A lens holder frame 17, holding a projection lens system 16 therein which is adjustable in focus, is supported for horizontal slide movement by the side stay 18 through a slide guide means 18a attached to the side stay 18. A generally box-shaped mirror housing 23B, which has an opening 23a, a bottom hole 23b and a rear wall 23c inclined at an angle of 45 degrees, is integrally formed with, or otherwise secured to, the lens holder frame 17 such that the optical axis of the projection lens system 16 is aligned with the center of the bottom hole 23a. Within the mirror housing 23B a reflective projection mirror 23 is attached to the rear wall 23c.

A link lever 40 is supported at its mid portion by the light source housing 10 through a pivot pin 41 so as to turn about the pivot pin 41. This link lever 40 is formed at its lower end with a bent extension 40a extending below the transparent stage 14T in the light source housing 10 and at its upper end portion located beside the mirror housing 23B with a elongated slot 40b. The lower bent extension 40a holds a light source 11, and the slot 40b receives a link pin 23d extending laterally from the mirror housing 23B. By means of the link lever 40, the mirror housing 23B and the lens holder frame 17, which are integrally formed, is operationally linked with the light source 11 such that when the link lever 40 is in its standard position as shown in FIG. 8, the optical axis $X_p$ of the projection lens system 16 is in alignment with the normal line $Y_p$ of the transparent stage 14T in which the light source 11 is positioned as shown by a double-dotted chain line in FIG. 9, and turning of the link lever 40 in the counterclockwise direction as viewed in FIG. 8 causes the mirror housing 23B and the lens holder frame 17 to be slid or shifted as one whole forward, i.e. toward a screen 5, relative to the transparent stage 14T and the light source 11 to be shifted rearward, i.e. away from the screen 5, relative to the transparent stage 14T.

As clearly shown in FIG. 9, when the link lever 40 is in its standard position, the optical axis $X_p$, which is aligned with the center normal line $Y_p$ of the transparent stage 14T and in which the light source 11 is located, is reflected at a right angle and directed to the remote screen 5 horizontally. When the link lever 40 is turned an angle of θ from the standard position, a substantial parallel translation is caused in opposite directions between the reflective projection mirror 23 and the projection lens system 16 as one whole, and the light source 11 with respect to the transparent stage 14T. This results in an increase in the reflection angle α of reflective projection mirror 23, providing an angle of elevation θ which is equal to the turned angle of the link lever 40. As a result, since the parallelism is still held among the transparent stage 14T, the projection lens system 16 and the remote screen 5 even when the overhead projector is adjusted so as to projects a well focused image 6M on the screen 5 at an angle of elevation, the image 6M has no distortion on the screen 5 as shown in FIG. 6.

Figure 10:
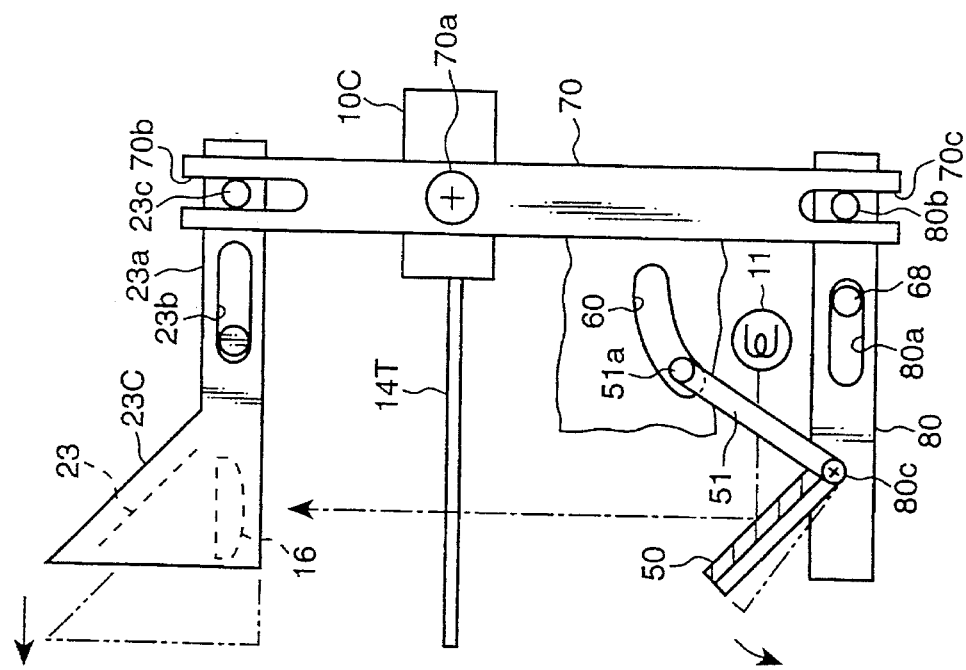
FIG. 10 is a schematic side view of a transmission type of an overhead projector in accordance with still another preferred embodiment of the present invention.

Referring to FIG. 10 showing a transmission type of overhead projector in accordance with another preferred embodiment of the present invention, the overhead projector includes a projector housing, which is shown as a stationary part 10C for simplicity. A flat transparent stage 14T is secured to the housing stationary part 10C for placing a transparent sheet thereon. A mirror housing 23C, holding a projection lens system 16 and a reflective projection mirror 23 therein, is disposed above the transparent stage 14T and is mounted for horizontal slide movement on the projector housing. In this instant, the reflective projection mirror 23 is inclined at an angle of 45 degrees relative to the optical axis $X_p$ of the projection lens system 16. This mirror housing 23C has an integral extension arm 23a formed with an elongated slot 23b and provided with a link pin 23c. The elongated slot 23b receives a guide pin 67 projecting from the projector housing so as to guide the horizontal movement of the mirror housing 23C.

A link lever 70, which is supported for rotative movement by the housing stationary part 10C through a horizontal shaft 70a, is formed at its upper and lower ends with open ended slots 70b and 70c, respectively. The upper slot 70 is engaged with the link pin 23c of the extension arm 23a of the mirror housing 23C, and the lower slot 70c is engaged with a link pin 80b secured to a slider 80. This slider 80 is supported for horizontal slide movement by the projector housing. The horizontal slide movement of the slider 80 is guided through the engagement between a guide pin 68 projecting from the projector housing and a horizontally elongated slot 80a formed in the slider 80.

A reflective mirror 50 is mounted for rotative movement on a pivot pin 80c secured to the slider 80. This reflective mirror 50 is integrally formed with, or otherwise rigidly connected to, a mirror link lever 51 at a portion where it is mounted on the pivot pin 80c. The mirror link lever 51 is provided at its free end with a cam follower pin 51a in sliding engagement with a curved cam slot 60 formed in the housing stationary part 10C. By means of the sliding engagement between the cam follower pin 51a and the curved cam slot 60, when causing horizontal slide movement of the slider 80, the mirror link lever 51 is moved in the same direction as the slider 80. At this time, the cam follower pin 51a slides in the curved cam slot 60, so as to turn the mirror link lever 51, and hence the reflective mirror 50. When the overhead projector is set in its standard position shown in FIG. 10, the cam follower pin 51a is brought into contact with one end of the curved cam slot 60 so as to place the reflective mirror 50 at an angle of 45 degrees relative to the transparent stage 14T.

A light source 11 such as a lamp is provided near the reflective mirror 50 within the projector housing. Light emanating from the light source 11 is reflected and directed to the transparent stage 14 by the reflective mirror 50.

Figure 11:
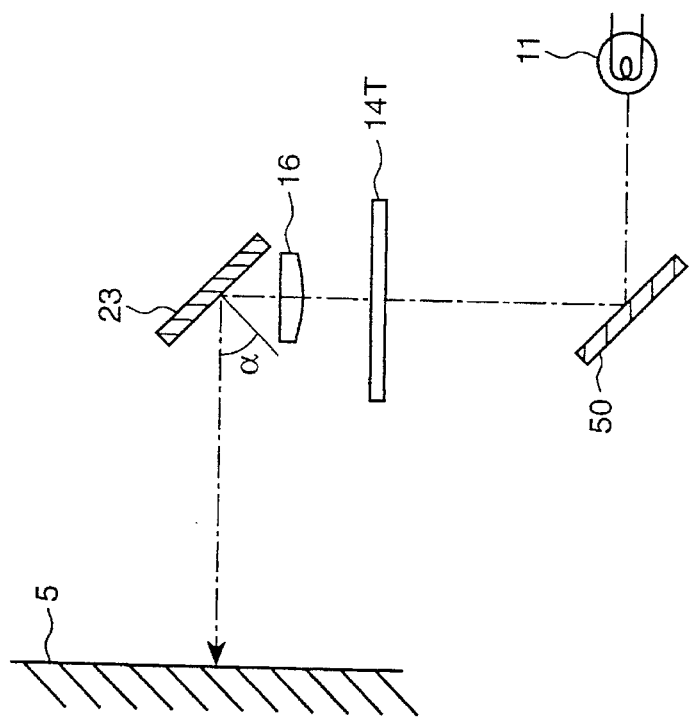
FIG. 11 is an schematic illustration of the overhead projector shown in FIG. 10 which is in its standard position.

Referring to FIG. 11 showing the optical path of the overhead projector which is in the standard position shown in FIG. 10, the projection mirror 16 is positioned so as to direct its optical axis $X_p$ vertically relative to the transparent stage 14, and the reflective projection mirror 23 and the reflective mirror 50 are positioned at a right angle relative to the optical axis $X_p$ of the projection lens system 16 and accordingly, parallel with each other. Since the reflective projection mirror 23 turns and directs the optical axis $X_p$ of the projection lens system 16 at an angle α equal to 45 degrees, the overhead projector in the standard position projects an image of a transparent sheet on the transparent stage 14 onto the remote screen 5 at an angle of elevation of zero (0).

Figure 12:
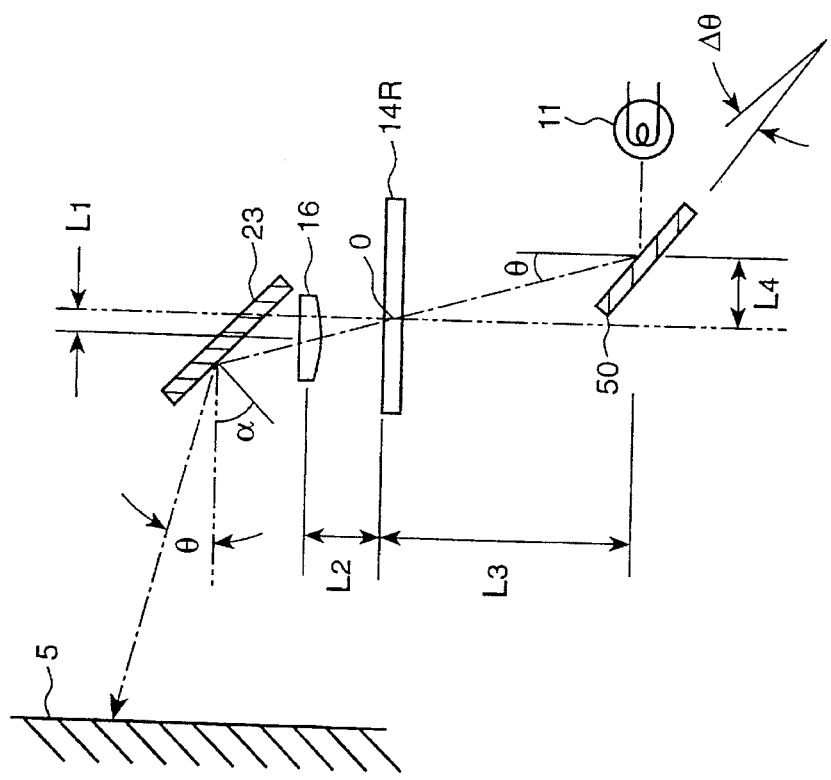
FIG. 12 is an schematic illustration of the overhead projector shown in FIG. 10 which projects an image at an angle of elevation.

Referring to FIG. 12 in connection with FIG. 10, the optical path of the overhead projector with the link lever 70 turned through an angle of θ in the counterclockwise direction as viewed in FIG. 10 is shown. Turning of the link lever 70 through an angle in the counterclockwise causes horizontal slide movement of the mirror housing 23C and the slider 80 in opposite directions. Specifically, when the mirror housing 23C slides toward the remote screen 5, the slider 80 slides toward the light source 11. During the slide movement of the slider 80 toward the light source 11, the cam follower pin 51a is forced being guided in the curved cam slot 60, so as to turn the mirror link lever 51, and hence the reflective mirror 50, in the counterclockwise direction about the pivot pin 80c of the slider 80. As a result, the principal ray of light from the light source 11 is reflected and directed by the reflective mirror 50 so as to pass the center of the projection lens system 26 and to become incident upon the reflective projector mirror 23 at an angle of α larger than 45 degrees. The principal ray of light reflected by the reflective projector mirror 23 at the angle of α is directed toward the remote screen 5 at the angle of θ relative to the horizontal line. In other word, the overhead projector projects an image on the remote screen 5 at an angle of elevation of θ.

Letting C, L1, L2, L3 and L4 be a center point on the transparent stage 14 where the principal ray of light reflected by the reflective mirror 50 impinges, the horizontal distance between the center point C of the transparent stage 14 and the optical axis of the projection lens system 16, the vertical distance between the transparent stage 14 and the projection lens system 16, the vertical distance between the transparent stage 14 and a center point on the reflective mirror 50 where the principal ray of light from the light source 11 impinges, and the horizontal distance between the center points of the transparent stage 14 and the reflective mirror 50, the following relation is given among the distances L1–L4:

$L4/L3 = L1/L2$; and $θ = \tan^{-1}(L1/L2) = \tan^{-1}(L4/L3)$

Since the principal ray of light is reflected by the reflective mirror 50 at the angle of θ relative to the vertical line when the reflective mirror 50 is turned through θ (=θ/2) from the standard position, the cam slot 60 is configured so as to have a curve satisfying the following relation:

$θ = θ/2 = \tan^{-1}(L1/L2)/2 = \tan^{-1}(L4/L3)/2$

As a result, since the parallelism is always held among the transparent stage 14T, the projection lens system 16 and the remote screen 5 even when the overhead projector is adjusted so as to projects a well focused image 6M on the screen 5 at an angle of elevation, the image 6M has no distortion on the screen 5 as shown in FIG. 6.

Figure 13:
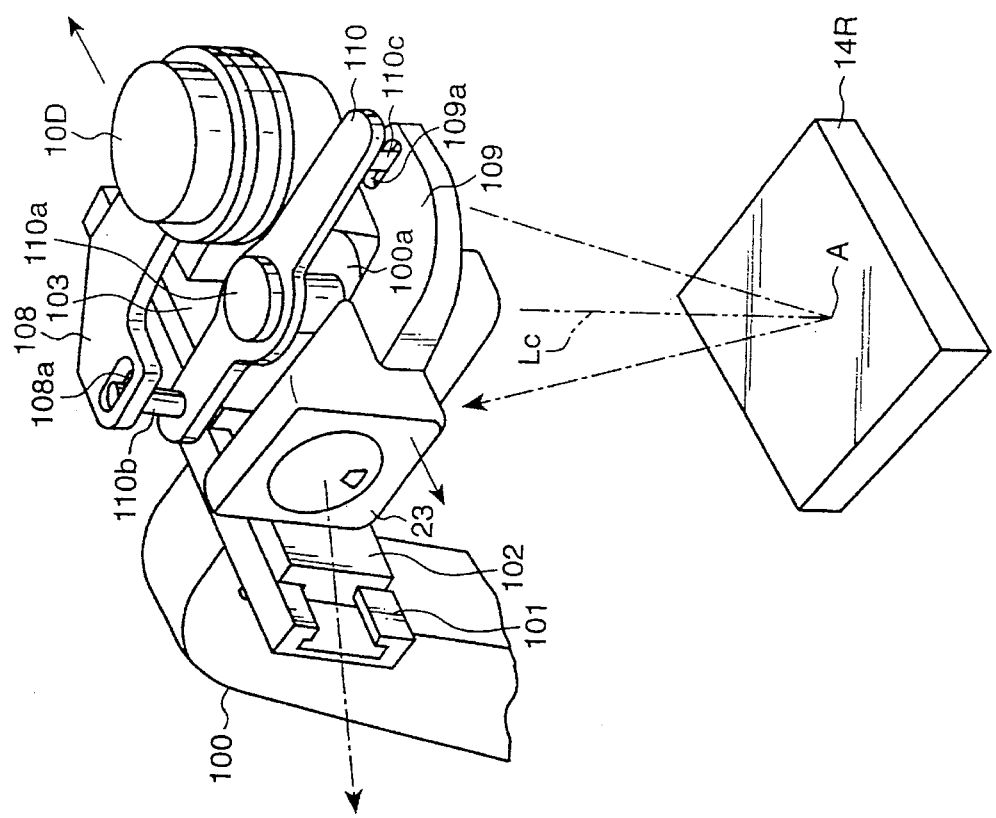
FIG. 13 is a schematic view of an essential part of a reflex type of an overhead projector in accordance with another preferred embodiment of the present invention.

Referring to FIGS. 13 and 14 showing a reflex type of overhead projector in accordance with a preferred embodiment of the present invention, the overhead projector has an upright or post 100 extending from a base (not shown) and provided at its top portion with a horizontal guide rail 101. A first slider 102, which is secured to a mirror housing 23D, is received for slide movement in the guide rail 101. Similarly, a second slider 103, which is secured to a light source housing 10D, is received for slide movement in the guide rail 101. Within the mirror housing 23D there are provided a projection lens system 16 and a reflective projection mirror 23 (see FIG. 14). Within the light source housing 10D there is provided a light source 11 (see FIG. 14).

The light source housing 10D and the mirror housing 23D are operationally linked with a rotative link lever 110 by means of first and second link levers 108 and 109. Specifically, the first link lever 108 extends toward the upright 100, i.e. rearward, from the light source housing 10D and is formed in its rear end portion with an elongated slot 108a. Similarly, the second link lever 109 extends away from the upright 100, i.e. forward, from the mirror housing 23D and is formed in its forward end portion with an elongated slot 109a. The rotative link lever 110 is supported at its mid portion for rotative movement by a vertical shaft 110a secured to a forward extension 100a of the upright 100 and is provided with a link pin 110b secured to its upper side and a link pin 110c secured to its under side, which are at a same horizontal distance from the vertical shaft 110a. These link pins 110b and 110c are received within the slot 108a of the first link lever 108 and the slot 109a of the second link lever 109, respectively. By means of this link mechanism including the first and second link levers 108 and 109 and the rotative link lever 110, moving of one of the mirror housing 23D and the light source housing 10D in one direction causes another housing in the opposite direction. In other words, the mirror housing 23D and the light source housing 10D are cooperated so as to move apart from and close to each other by a same horizontal distance. A flat reflective stage 14R is fixedly attached to the base below the mirror housing 23D and the light source housing 10D so that the center A of the reflective stage 14R is in the center line Lc of the vertical shaft 110a.

Referring to FIG. 15, the reflective stage 14R is comprised by a flat reflective mirror 14a and a Fresnel lens 14b placed on the flat reflective mirror 14a. The flat surface 14c of the Fresnel lens 14b is used as a stage surface on which a transparent sheet 6 to be projected is placed. With this reflective stage 14R, light emanating from the light source 11 is reflected by the reflective mirror 14a and then illuminates the transparent sheet 6 placed on the Fresnel lens 14b from the under side.

As clearly shown in FIG. 14, when the rotative link lever 110 is in its standard position where it locates the mirror housing 23D and the light source housing 10D as close as possible as by double-dotted chain line in FIG. 14, the overhead projector projects an image of the transparent sheet 6 horizontally, i.e. at an angle of elevation of zero (0), on the remote screen 5. When the rotative link lever 110 is turned an angle from the standard position, the reflective projection mirror 23 and the projection lens system 16, as one whole, and the light source 11 are moved horizontally apart from each other by a same distance from the center line Lc of the vertical shaft 110a as shown by rigid line in FIG. 14. As a result, the principal ray from the light source 11 still enters the reflective stage 14R at the center A and is reflected by the reflective stage 14R at an increased reflection angle. In this instance, since the parallelism is still held among the transparent stage 14R, the projection lens system 16 and the remote screen 5, and an increase is caused in the reflection angle α of the reflective projection mirror 23, making the overhead projector projects a well focused image of the transparent sheet 6 at an angle of elevation 8 without distortion.

In the above embodiment, although the reflective projection mirror 23 and the projection lens system 16 are moved horizontally as one whole, they may be moved separately. In this instance, the projection lens system 16 is moved less than the reflective projection mirror 23. Further, either the mirror housing 23D or the light source housing 10D may be fixed. In this case, another one of the mirror housing 23D and the light source housing 10D, and the stage 14 are moved horizontally relative to the one of the mirror housing 23D and the light source housing 10D which is fixed.

As apparent from the above description concerning various embodiments of the present invention, since the parallelism is always held among the stage 14T, 14R, the projection lens system 16 and the remote screen 5, even when the overhead projector is adjusted so as to project an enlarged image at an angle of elevation, the enlarged image projected on the screen is not accompanied with distortion.

It is to be understood that although the present invention has been described with respect to preferred embodiments thereof, various other embodiments and variants may occur to those skilled in the art, which fall within the scope and spirit of the invention. Such other embodiments and variants are intended to be covered by the following claims.

What is claimed is:

1. An overhead projector for projecting an image of sheet material on a remote screen standing almost vertically, said overhead projector comprising:

a stage having a stage surface on which the sheet material is placed;

a light source disposed below said stage for illuminating said sheet material;

a projection lens system having an optical axis which is aligned with a normal line, normal to said stage surface, and projecting the image of said sheet material;

a reflective projection mirror, disposed above said projection lens system at an angle of 45 degrees with respect to said optical axis of said projection lens system, for reflecting and directing said image horizontally toward said remote screen, said reflective projection mirror being rotatively shiftable so as to reflect said image at an angle of elevation; and linkage means for operationally linking at least said projection lens system and said reflective projection mirror to each other, rotatively shifting said reflective projection mirror, and shifting said projection lens system in position relative to said stage surface while keeping said optical axis parallel to said normal line when rotatively shifting said reflective projection mirror;

wherein said linkage means is further for operationally coupling said stage to said projection lens system so as to rotatively shift it through an angle which is the same as an angle through which said projection lens system is rotatively shifted.

2. An overhead projector as defined in claim 1, wherein said linkage means includes first, second and third axes of rotation which are vertically separated and extend horizontally parallel to one another, for supporting rotative movement of said stage, said projection lens system and said reflective projection mirror, respectively, and causes said stage and said projection lens system to rotate together through an angle about said first and second axes, respectively, when said reflective projection mirror is rotated through a half of said angle about the third axis.

3. An overhead projector as defined in claim 2, wherein said linkage means further comprises a first link lever rotatively supported on said third axis, said first link lever being rotative in proportion to an angle through which said reflective projection mirror is rotatively shifted, and a second link lever rotatively supported on one of said first and second axes, said second link lever being operationally linked with said first link lever so as to rotate one of said stage and said projection lens system through an angle two times as large as an angle through which said first link lever is rotated.

4. An overhead projector as defined in claim 2, wherein said linkage means comprises an angular sensor for detecting the angle through which said reflective projection mirror is shifted about said third axis, and a motor operationally coupled to one of said stage and said projection lens system, said motor rotating said one of said stage and said projection lens system through an angle two times as large as said angle detected by said angular sensor.

5. An overhead projector as defined in claim 2, wherein said linkage means further comprises an angular sensor for detecting the angle through which one of said stage and said projection lens system is rotated about one of said first and second axes, and a motor operationally coupled to said reflective projection mirror, said motor rotating said reflective projection mirror through an angle half as large as said angle detected by said angular sensor.

6. An overhead projector for projecting an image of sheet material on a remote screen standing almost vertically, said overhead projector comprising:

a stationary stage having a flat horizontal stage surface on which the sheet material is placed;

light source means for illuminating said sheet material;

a projection optical system, disposed above said stage, for projecting and directing horizontally an image of said sheet material onto said remote screen; and linkage means, operationally linking said light source means and said projection optical system to each other, for causing an opposite horizontal shift in position relative to said stage between said projection optical system and said light source means so that said projection optical system projects said image at an angle of elevation;

wherein said stationary stage is transparent, said light source means is disposed below said stationary stage, said linkage means includes a link lever pivoted to said stationary stage so as to rotate in a vertical plane and supporting said projection optical system and said light source means on opposite sides of said stationary stage, said linkage means further includes a first slider to which said projection optical system is secured and a second slider to which said light source means is secured, the first and second sliders being engaged with said link lever so as to be horizontally slid in opposite directions by said link lever, and said light source means comprises a stationary light source and a reflection mirror rotatably attached to said second slider, said reflection mirror being rotated through an angle of $\theta/2$ when an angle of elevation of $\theta$ is required.

7. An overhead projector as defined in claim 6, wherein said light source means further includes a stationary cam and a cam follower secured to said reflection mirror, said stationary cam having a curve represented by $\tan^{-1}(L_h/L_v)/2$, where $L_h$ is a vertical distance between said stationary stage and said reflection mirror and $L_v$ is a horizontal distance by which said second slider is shifted.

8. An overhead projector for projecting an image of sheet material on a remote screen standing almost vertically, said overhead projector comprising:

a stationary stage having a flat horizontal stage surface on which the sheet material is placed;

light source means for illuminating said sheet material;

a projection optical system, disposed above said stage, for projecting and directing horizontally an image of said sheet material onto said remote screen; and linkage means, operationally linking said light source means and said projection optical system to each other, for causing an opposite horizontal shift in position relative to said stage between said projection optical system and said light source means so that said projection optical system projects said image at an angle of elevation;

wherein said stationary stage is reflective, said light source means is disposed above said stationary stage and said linkage means includes a link lever pivoted on a vertical axis above said stationary stage so as to rotate in a horizontal plane and supporting said projection optical system and said light source means on opposite sides of said vertical axis.

* * * * *